United States Patent
Tzeng

[19]

[11] Patent Number: 6,028,669
[45] Date of Patent: Feb. 22, 2000

[54] SIGNAL PROCESSING FOR IN SITU MONITORING OF THE FORMATION OR REMOVAL OF A TRANSPARENT LAYER

[75] Inventor: Huey M. Tzeng, San Jose, Calif.

[73] Assignee: Luxtron Corporation, Santa Clara, Calif.

[21] Appl. No.: 08/899,470

[22] Filed: Jul. 23, 1997

[51] Int. Cl.[7] .................................................. G01B 9/02
[52] U.S. Cl. ........................... 356/355; 356/357; 356/360
[58] Field of Search .................................. 356/357, 359, 356/360, 355

[56] References Cited

U.S. PATENT DOCUMENTS

| | | |
|---|---|---|
| 4,618,262 | 10/1986 | Maydan et al. . |
| 4,660,979 | 4/1987 | Muething ................................. 356/357 |
| 4,717,446 | 1/1988 | Nagy et al. . |
| 4,953,982 | 9/1990 | Ebbing et al. . |
| 4,998,021 | 3/1991 | Mimasaka . |
| 5,190,614 | 3/1993 | Leach et al. . |
| 5,308,447 | 5/1994 | Lewis et al. . |
| 5,362,969 | 11/1994 | Glenn . |
| 5,433,651 | 7/1995 | Lustig et al. . |
| 5,461,007 | 10/1995 | Kobayashi . |
| 5,499,733 | 3/1996 | Litvak . |

FOREIGN PATENT DOCUMENTS

WO9325893 of 1993 WIPO .
WO9407110 of 1994 WIPO .

Primary Examiner—Robert Kim
Attorney, Agent, or Firm—Majestic, Parsons, Siebert & Hsue

[57] ABSTRACT

The deposition material on, or removal of material from, an article, such as on an exposed surface of an intermediate integrated circuit structure, is optically monitored. The processes that are so monitored include the formation of a dielectric layer on a semiconductor wafer, and the removal of material from such a layer by planarization, polishing, or etching, a process of chemical-mechanical-polishing (CMP) being given as an example. A resulting optical signal is detected and processed in real time to provide information of the progress of the material formation or removal and an indication when an end point has been reached. The optical signal being processed varies sinusoidally as a result of interference between light reflected from a surface being operated upon and light reflected from some other surface. A differential or integral of this signal is formed to provide additional peaks and valleys that are detected in order to obtain data points from the signal every one-quarter period. This allows a very early determination of the amount of material being added or removed, the rate that this is occurring, and the like, which determinations are repetitively updated as more signal data points are acquired. This information can be provided to an individual who is operating the processing equipment, and/or can be used to directly control the processing equipment.

42 Claims, 5 Drawing Sheets

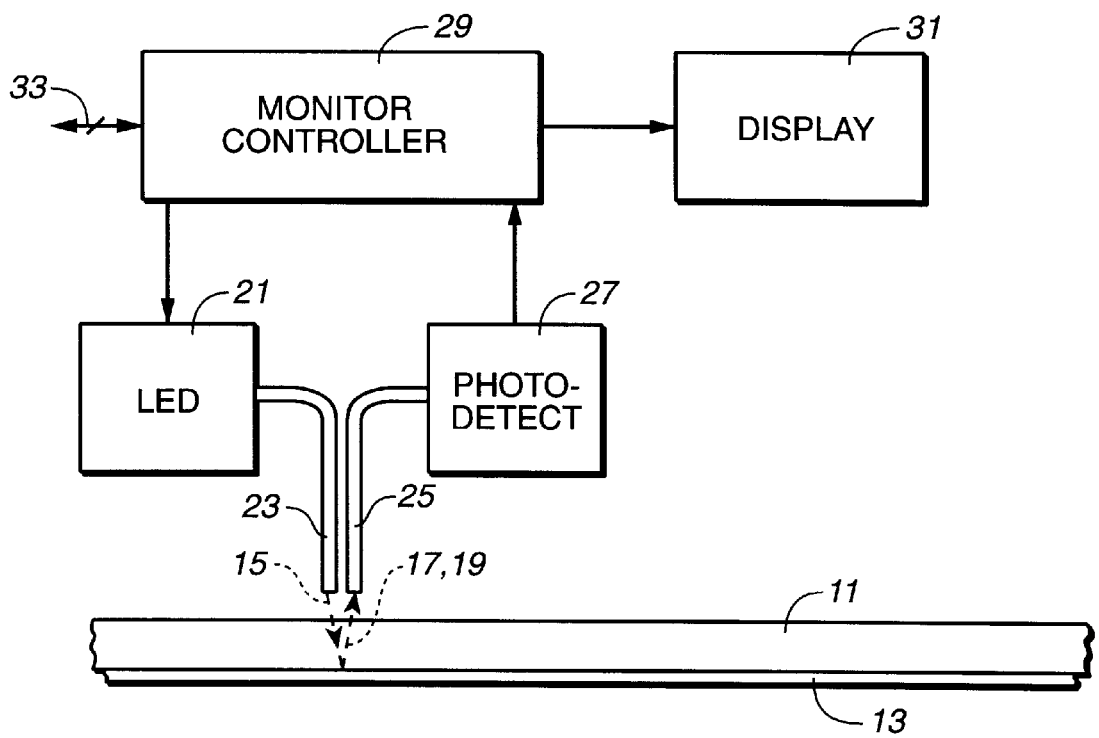
FIG._1
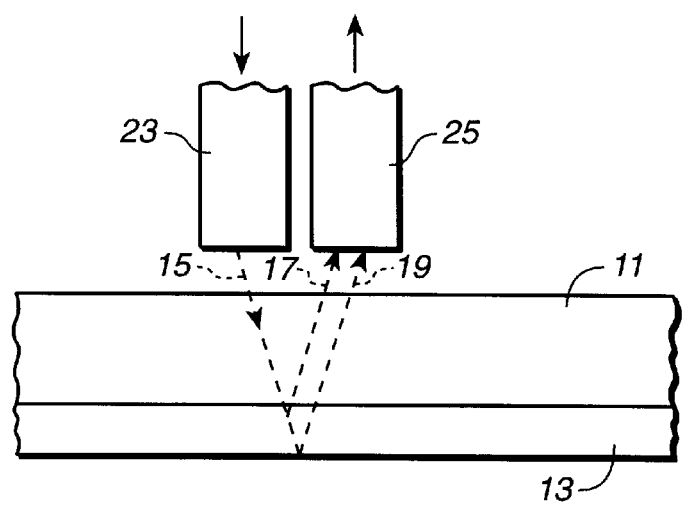
FIG._2

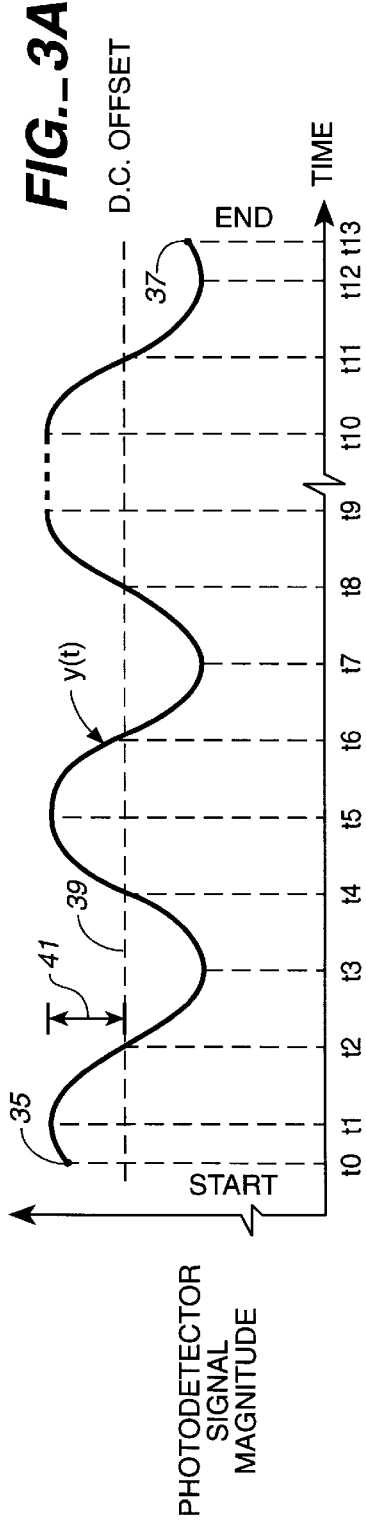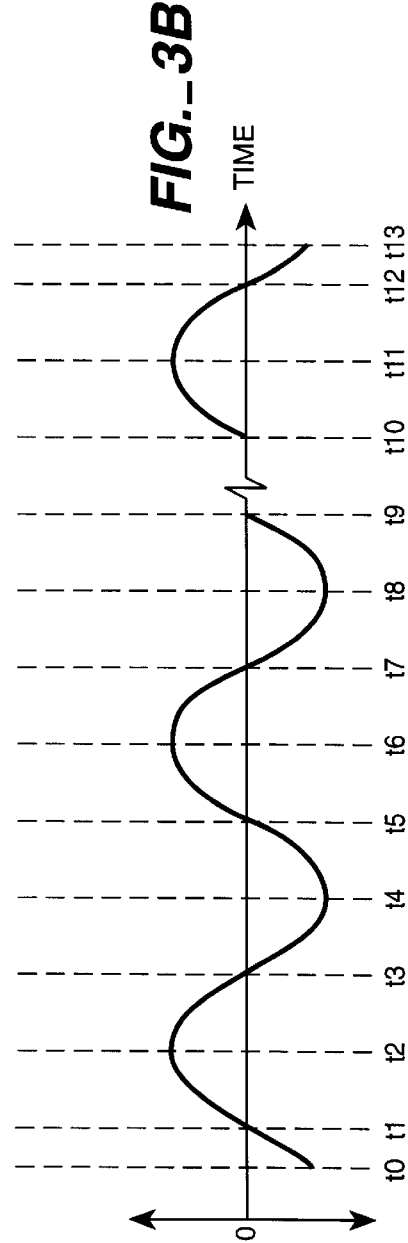

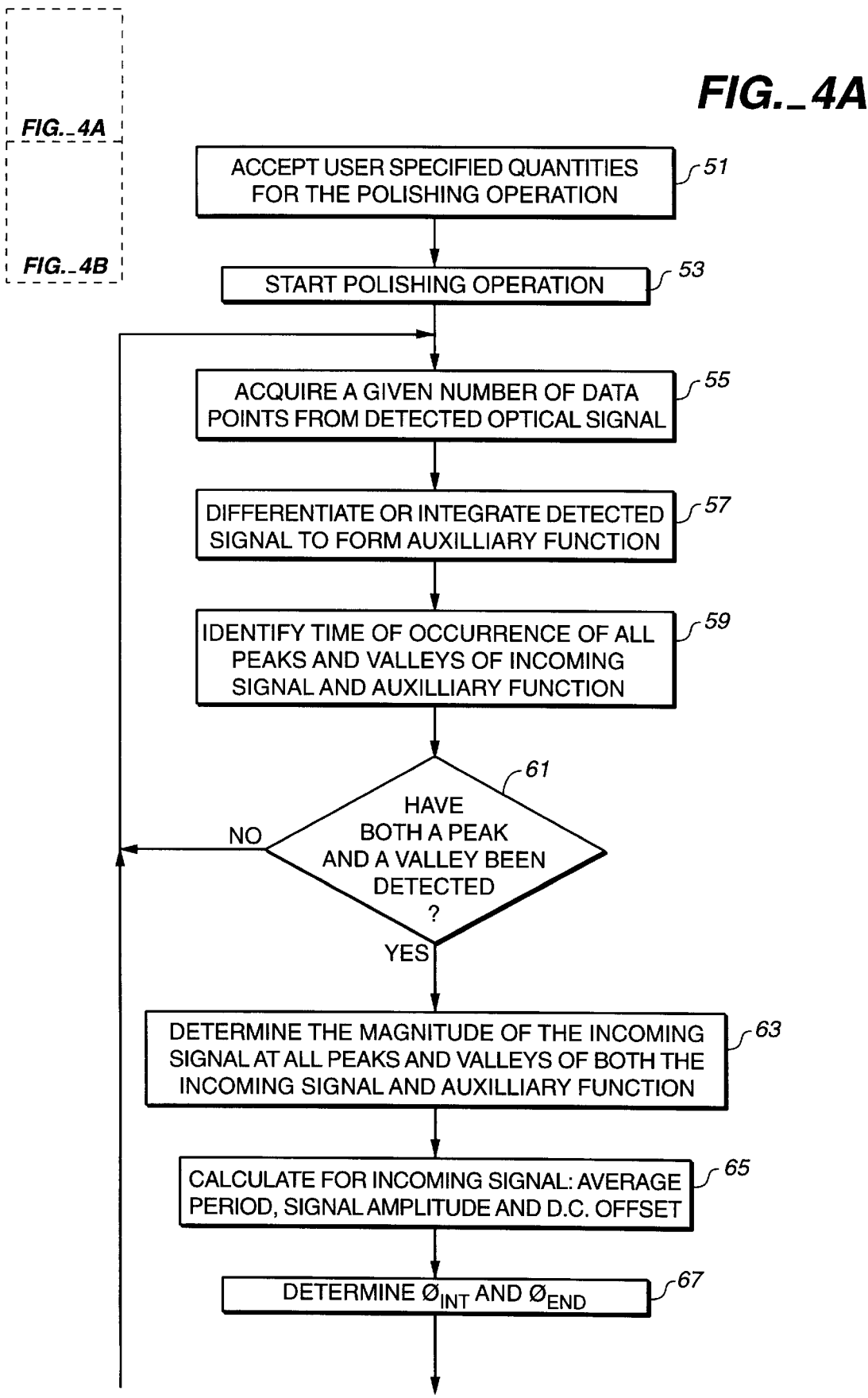
FIG._4A

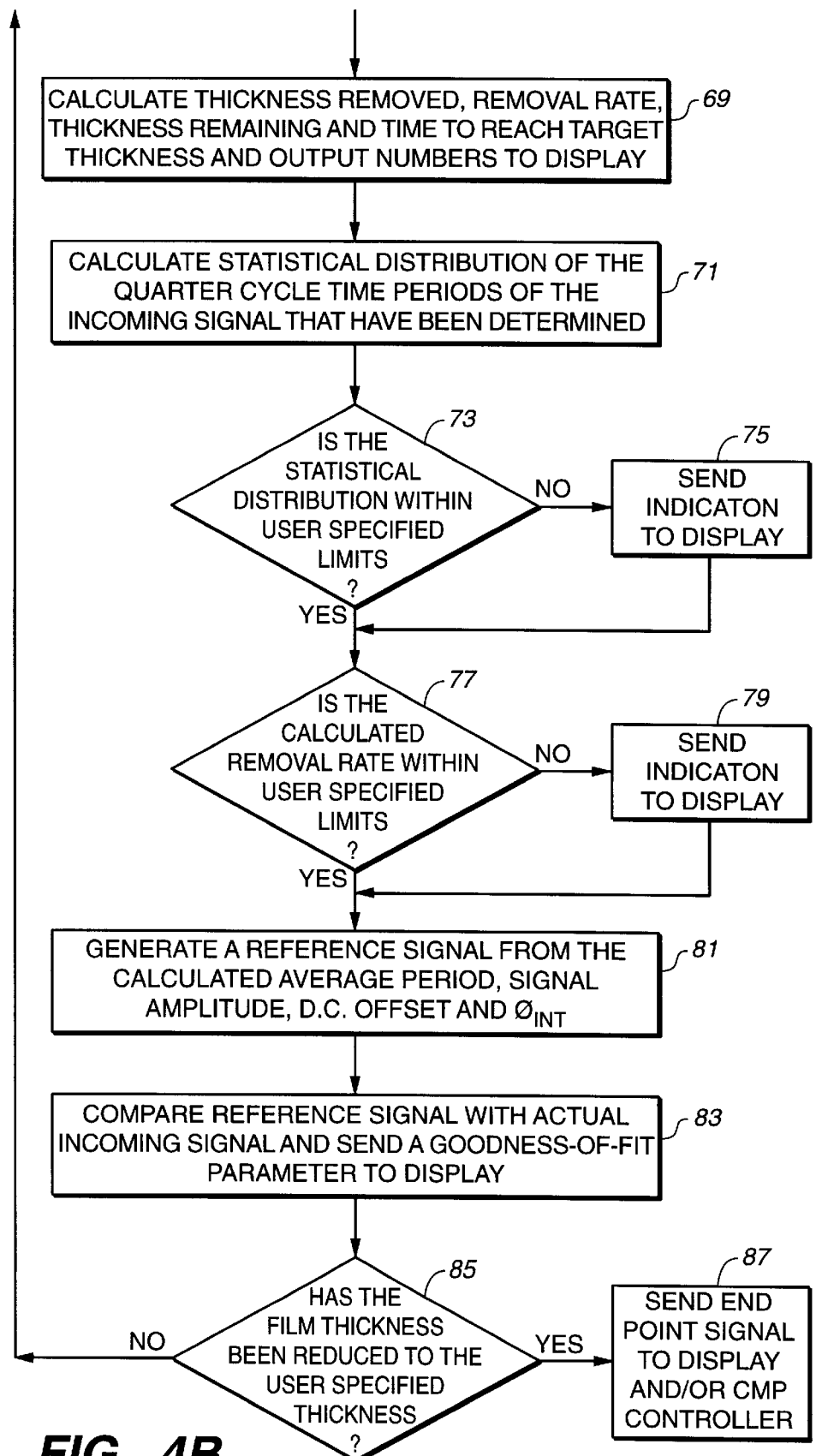
FIG._4B

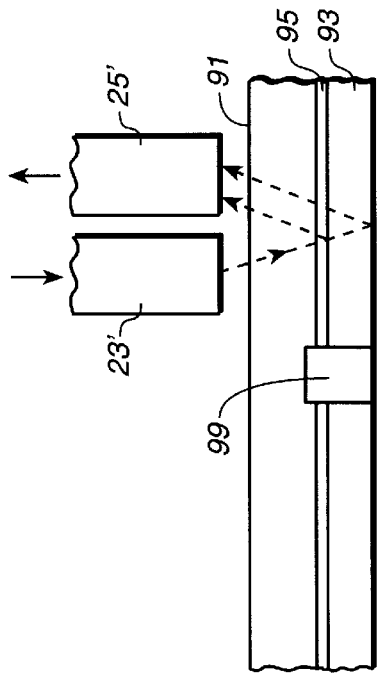
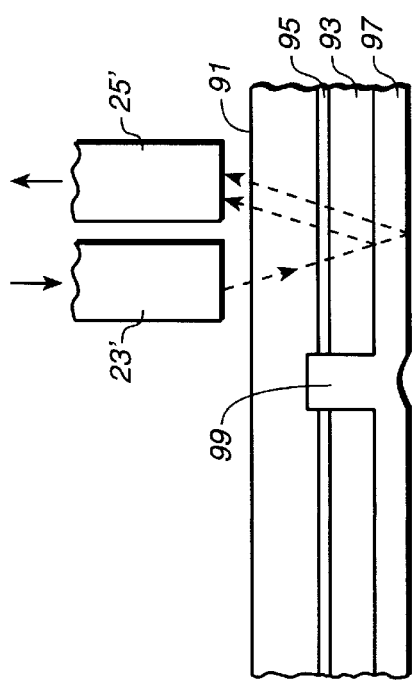
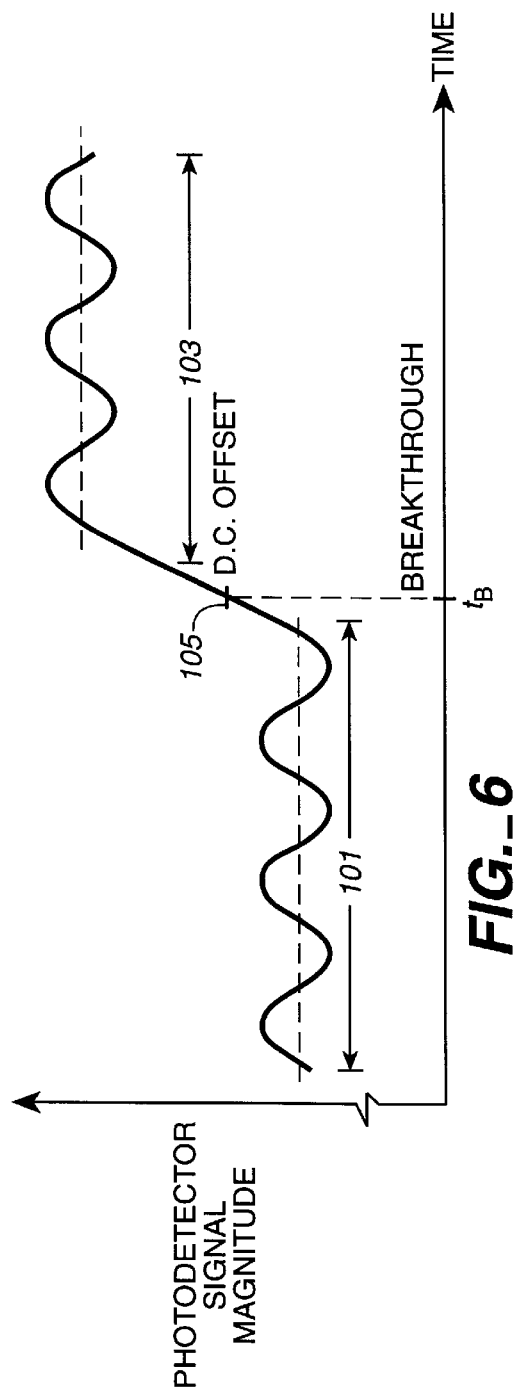

SIGNAL PROCESSING FOR IN SITU MONITORING OF THE FORMATION OR REMOVAL OF A TRANSPARENT LAYER

BACKGROUND OF THE INVENTION

This invention relates generally to techniques of monitoring a process being performed to transform a surface of an article, an example being a semiconductor wafer, such as by monitoring the formation or removal of a layer of material. A specific application of the invention is to monitor the progress of a chemical-mechanical-polishing ("CMP") process on a surface carried by a semiconductor wafer, including detecting an endpoint of the process.

CMP, usually resulting in planarization of a surface, is a key technology used for the fabrication of advanced microelectronic devices (e.g. those having critical dimensions that are less than about 0.5 micron) on substrates. Planarization allows smaller features to be fabricated, which leads to denser circuit packing and faster circuit response, which in turn results in faster logic devices and higher capacity memories. In addition, planarized surfaces allow for the fabrication of circuit devices having multiple levels of metallization, and therefore a more sophisticated design. The process consists of mechanically grinding or polishing of the work piece (generally a thin film microelectronic circuit imposed on a silicon wafer) against a rotating polishing wheel (platen), in the presence of a chemical slurry therebetween. The slurry provides both abrasive particles (to accomplish the mechanical grinding) and reactive chemicals (to assist the film removal by chemical modification of the film surface). The wafer is typically held (by frictional forces) to a polishing head or wafer carrier, which itself rotates, and which provides downward pressure of the wafer against the platen. A porous polymeric polishing pad mounted on the platen helps to trap the abrasive slurry particles, and provides a conformable surface that aids in the planarization process.

Process control, and specifically endpoint control, has become a key issue in CMP, in part because of process variations, such as in the above mentioned slurry and polishing pad, and in part because of variations in the thickness, composition, and uniformity of the films to be polished. U.S. Pat. No. 5,499,733 is directed to such process control. This patent is hereby incorporated herein by this reference. Briefly, an interrogating optical beam having a wavelength to which the wafer is substantially transparent is directed through the back side of the wafer being polished. The state of removal of the film on the front side of the wafer is then inferred from the time evolution of the amount of the interrogating light which is reflected from the film surface. In the case of opaque (e.g. metal) films, a pronounced shift in reflected light intensity often occurs when the film has been completely removed, thus signaling an endpoint of the process. In the case of transparent films (e.g. silicon dioxide and other dielectrics), the time evolution generally consists of alternating intensity peaks and valleys caused by the well known effects of thin film optical interference. By analyzing the pattern of peaks and valleys, one can determine the amount of film that has been removed, thus allowing an endpoint of the process to be called when a predetermined amount of film removal has occurred.

Pending U.S. patent application Ser. No. 08/585,164, filed Jan. 11, 1996, describes a specific CMP machine. This application is incorporated herein by this reference. In that machine, multiple optical sensors are distributed across the wafer carrier in order to monitor the uniformity of material removal across the wafer. These sensors are fixed to the rotating wafer carrier and communicate with a stationary processor by a wireless link. An end point to the process is determined after a certain percentage of the sensors have detected that an end point has been reached at their respective locations across the wafer. The amount of material being removed from a transparent layer is monitored in situ by counting the peaks, valleys and zero crossings of an optical interference signal obtained by each sensor. The interference signal may also be subjected to a known curve fitting algorithm, such as the least squares algorithm, to improve the accuracy of the measurement.

These same transparent layer thickness monitoring techniques can be applied to the growth or deposition of a transparent film onto a substrate such as a semiconductor wafer. A popular technique for depositing a transparent film of material, such as silicon dioxide, onto a substrate is chemical vapor deposition ("CVD"). The increasing thickness of the film is optically monitored by the interference technique and an end point is detected when a desired thickness is obtained.

It is a primary object of the present invention to provide techniques for monitoring amounts of material being added to or removed from a transparent layer that provide initial measurements very early after the beginning of the process.

It is also an object of the present invention to provide improved techniques for detecting the break through of a transparent layer as a result of material removal.

It is another object of the present invention to provide techniques for monitoring and controlling CMP processes used in the manufacturing of integrated circuits, flat panel displays, and the like.

SUMMARY OF THE INVENTION

These and additional objects are accomplished by the present invention, wherein, briefly and generally, according to one aspect of the invention, the changing thickness of a transparent layer is monitored by accurately locating the first peak or valley and zero crossing of an optical interference signal, calculating from this limited information the amount of material being added or removed and the rate of such change, and then repeatedly updating these calculations by including new interference signal data points as the process proceeds. The first calculation is made after only one-quarter a period of the interference signal. In order to accurately locate the zero crossings of the interference signal, an auxiliary function is calculated by differentiating or integrating the signal. Since the auxiliary function is shifted ninety degrees in phase from the interference signal, peaks and valleys of the function, which are accurately detectable, occur at the zero crossings of the signal, thus allowing the zero crossings to be accurately found. The magnitude of the interference signal at the zero crossings is a d.c. offset of the signal and a peak of the signal measured from the d.c. offset is a measure of the peak signal amplitude. These additional quantities may, along with the timing of the peaks, valleys and zero crossings, be used to verify the robustness of the data being measured.

According to another aspect of the present invention, a break through the transparent layer to another transparent layer there beneath that has a different refractive index is detected by monitoring a sudden defined change in the d.c. offset of the signal. If desired, the removal of the lower transparent layer continues with it being monitored in the same way as before.

Additional objects, features and advantages of the various aspects of the present invention are described in the following description of its preferred embodiments, which description should be taken with the following drawings.

BRIEF DESCRIPTION OF THE DRAWINGS

FIG. 1 is a schematic representation of a technique of monitoring film thickness to which the various aspects of the present invention are applied;

FIG. 2 illustrates monitoring an optical interference signal to implement the process of FIG. 1;

FIGS. 3A–D show the monitoring and processing of an interference signal acquired as shown in FIG. 2;

FIG. 4 is a flow chart illustrating a preferred algorithm for monitoring changes in a transparent film from the signals shown in FIGS. 4A–D;

FIGS. 5A–B illustrate beginning and ending stages of a particular transparent layer removal process; and FIG. 6 is a curve that shows monitoring the material removal process illustrated in FIGS. 3A–B.

DESCRIPTION OF THE PREFERRED EMBODIMENTS

A semiconductor wafer substrate 11 of FIGS. 1 and 2 carries a film 13 that is either being increased or decreased in thickness. In this particular example, a beam 15 of optical radiation is directed through the substrate 11 to interact with the layer 13. A portion of the intensity of the radiation beam 15 is reflected at a rear surface of the layer 13, as indicated by a ray 17, and another portion reflected from a front side of the layer 13, as indicated by a ray 19. These reflections result from the materials on opposite sides of the layer 13 having a different refractive index. The radiation is directed through the substrate from its back side in applications where the front side of the layer 13 is not clearly accessible optically, such as in most CMP machines, in liquid etching processes, in CVD processing, and the like. The principles of the present invention also apply, however, to directing the radiation beam 15 to the layer 13 from its front side, where that is possible and convenient. When directed through the substrate, the wavelength of the beam 15 is chosen to be that to which the substrate 11 is transparent. When the substrate 11 is a semiconductor wafer, that wavelength is made to be in excess of about one micron, 1.3 micron being convenient.

The radiation beam is provided by a source 21 and delivered by an optical transmission medium 23. The radiation source 21 is preferably a light emitting diode ("LED"), which is a source of radiation having a narrow wavelength band. A coherent source such as a diode laser may alternatively be used but is generally not necessary. Radiation reflected from the rear and front surfaces of the layer 13 is gathered by an optical transmission medium 25 and directed onto a photodetector 27. The optical transmission media 23 and 25 are each preferably a single optical fiber but may, alternatively, each be some other form of light pipe or include multiple optical fibers.

The monitoring system is controlled by a controller 29 that receives an electrical signal output of the photodetector 27, digitizes it and makes various determinations and calculations in order to provide quantities related to the increasing or decreasing thickness of the layer 11, depending upon the particular process being monitored. These and additional quantities are displayed on a monitor or some other type of display 31, for the information of the operator of the equipment carrying out the process. Additionally, as indicated by a bus 33, the controller 29 is also preferable connected with a controller (not shown) of the process equipment. Through this connection, the monitor controller 29 can receive signals related to the process being performed on the layer 13, and can send information about the state of the process that the process equipment controller can use to better control the process.

With reference to the waveforms of FIGS. 3A–D and an operational flow chart of FIG. 4, an example of process monitoring according to the present invention is given. In this example, material is being removed from the front side of the layer 13 by CMP, chemical etching, or some other process. A waveform of FIG. 3A shows the incoming signal to the controller 29 from the photodetector 27. This sinusoidally shaped waveform results from the interference between the radiation 17 reflected from the back of the layer 13, or from some other surface of the article that remains unchanged during the process, and the radiation 19 reflected from its front. The signal variation results from material being removed from the front of the layer 13. The amount that the thickness of the layer 13 is reduced may be quantitatively determined from this signal. One period of this signal (such as from time t2 to time t6), which can have a duration of a fraction of a second to a number of seconds in length, occurs when an amount of material has been removed that is equal to the wavelength of the source 21 divided by two times the refractive index of the material of the layer 13. Thus, by counting the number of periods that occur between a start 35 of a material removal process to an end 37 of this process, and then making this simple calculation, the amount of material removed is ascertained.

By the present invention, the amount of material being removed and the rate of such removal are monitored constantly from a time very shortly after the beginning of the process. The controller 29 determines the times of the peaks (such as occurring at times t1 and t5) and valleys (such as occurring at times t3 and t7) of the incoming signal of FIG. 3A almost instantaneously as they occur. The controller also calculates a differential or integral of the incoming signal, a differential of it being shown in FIG. 3B as an auxiliary function. The times of the peaks (such as at times t2 and t6) and valleys (such as at times t4 and t8) of the auxiliary function are also determined by the controller 29 as a way of determining the points where the incoming signal of FIG. 3A crosses a d.c. offset level 39. The incoming signal may be normalized to this d.c. offset level as a "zero" level of a sinusoidal a.c. signal having a peak amplitude 41.

In the example shown in FIGS. 3A–D, a first determination of the amount of material removed and a rate of removal may be made shortly after time t2. By knowing the relative time t1, determined by detecting the peak of the incoming signal, and the relative time t2 of the signal zero crossing, determined by detecting the peak of the auxiliary function, the amount of the reduction of the thickness of the layer 13 between those times is calculated. The removal rate is then calculated to be that amount divided by the time that elapsed between t1 and t2. The total amount of material removed at time t2 is that amount plus an amount removed during an initial time $\phi_{INT}$ that is less than one-quarter of a period, occurring between times t0 (the start 35) and t1. That initial amount of material removed is determined by multiplying the measurement of the material removed between times t1 and t2 by the time $\phi_{INT}$ divided by the time between t1 and t2.

This first measurement is very useful since it occurs very early in the process. But since it is based upon only two points, it can be subject to error from the presence of noise. Therefore, the measurement is repeated during the removal process as new data is acquired. Individual periods determined at the time of each thickness and rate calculation are then averaged to reduce the effects of noise.

In addition to the relative times, the level of the incoming signal of FIG. 3A may also be determined at the early part of the process. The d.c. offset level 39 is the value of the incoming signal at time t2, and at the time of every peak and valley of the auxiliary function after that. The amplitude 41 of the incoming signal is a difference between the d.c. offset level 39 and the magnitude of the incoming signal at its peaks and valleys. These measurements are averaged over time, so that the quantities of d.c. offset and signal amplitude become less subject to the effects of noise over time and thus are more accurate.

Referring now to the flow chart of FIG. 4, the example CMP process will be explained in greater detail. As a first step 51, the operator of the CMP equipment enters into the monitor controller 29, by a keyboard or other device (not shown), certain information about the polishing process that he or she is about to start. This information can include the type of film that is being removed, including its refractive index, the initial film thickness, the desired target thickness at the end of the process, the expected time to reach that target and reasonable bounds of the material removal rate. The last two items are used to verify the accuracy of the measurements and the calculations, as explained below. After this information is entered, the operator initiates the polishing operation, as indicated by a step 53.

Digitized data points are periodically loaded in chunks into the controller 29 for processing. This can be done periodically, under control of a controller clock, or in response to some cycle of the CMP machine such as a wafer carrier completing a resolution, as sensed by an appropriate position sensor. A first such chunk of data is loaded in a step 55. This provides data of a first part of the incoming signal of FIG. 3A. A next step 57 calculates the auxiliary function of FIG. 3B. As indicated by a step 59, the times t1, t2, t3 etc. of the peaks and valleys of both the incoming signal and the auxiliary function are determined.

In a next step 61, it is verified that both one peak or valley of the incoming signal, and one peak or valley of the auxiliary function, have been detected. If so, the processing proceeds to a step 63 since the first calculation of material removed and rate of removal described above can be made. If two such points have not yet been acquired, the process returns to the step 55 to acquire another chunk of data of the incoming signal.

The step 63 determines the magnitude of the incoming signal at each of the times shown in FIG. 3A. That is, the magnitude is measured at each of the times t1, t2, t3, etc., where a peak or valley of either of the incoming signal or auxiliary function is detected. These values, and the time values from the step 59, are then used in a step 65 to calculate averages of the periods, d.c. offset 39, and amplitudes 41. A next step 67 calculates the time intervals $\phi_{INT}$ and $\phi_{END}$. The interval $\phi_{END}$, an example of which is shown in FIG. 3D, is an amount less than one-quarter cycle of the incoming signal that is included in the chunk(s) of incoming signal data being processed.

There is now enough information from which the thickness removed from the layer 13 at the time of the end of the chunk(s) of acquired data, and the rate of material removal, may be calculated with the relationships discussed above. This is done in a step 69. Also, as part of that step, the thickness of the layer that remains to be removed may be determined by subtracting the calculated amount removed from the amount the operator entered in the step 51 to be removed. Further, the time remaining may be calculated by subtracting the elapsed time from that entered in the step 51 by the operator. All of the quantities determined in the step 69 are then displayed for the operator to see them. Certain of these quantities can also be sent to the CMP controller to assist in the control of the process.

The next steps 71–83 are optionally provided to verify that the thickness and other results being obtained are not corrupted in some major way. In a step 71, a measure of a statistical distribution of the individual one-quarter cycle time intervals calculated. If that distribution is not within limits set by the operator, which limits can additionally be inputted as part of the step 51, an indication is given on the display 31, as indicated by steps 73 and 75. Such an indication means that the times of the quarter cycles of the incoming signal vary more than is desired. The operator can then determine whether it is bad enough that the measurements should be disregarded or the CMP process modified. Ideally, the duration of each quarter cycle of the incoming signal of FIG. 3A is the same or change very slowly.

In a step 77, the calculated material removal rate from the step 69 is compared to the boundaries of the expected rate that was inputted by the operator in the step 51. If not within those limits, an indication is made on the display 31.

As can be seen from FIG. 3A, the incoming signal there shown can be mathematically expressed by, $$y(t) = (d.c.) + A \cos(t/\text{period} + \phi_{INT})$$

where "d.c." is the d.c. offset 39, "A" is the amplitude 41, "t" is the total amount of time elapsed since the beginning 35 of the process, and "period" is the duration of a cycle of the signal, all averages. This function is generated in a step 81 from the averages calculated earlier, and, in a step 83, compared with the actual incoming signal of FIG. 3A to determined how closely they fit. This comparison may be performed by cross correlating the generated function and the actual signal. A goodness-of-fit parameter is then displayed.

In a next step 85, it is determined whether enough material has been removed from the layer 13 to reduce it to the thickness that the operator inputted in step 51. If so, an end point signal is displayed and the process may be automatically terminated, as indicated in a step 87. If not, the process returns to the step 55 and repeats with an added chunk of acquired signal data. During each such repeat, the step 61, which only applies to the first chunk of data and set of calculated values, is omitted.

Although the example described with respect to FIGS. 3A–D and FIG. 4 has been for a CMP process, the same monitoring technique applies to other material removal processes, including chemical and dry etching. Further, the same technique is useable to monitor the growth, deposition or other formation of a layer of material 13 rather than its removal. The foregoing description applies to monitoring the formation of a layer except that references to removing material from the layer should be taken to be adding material to the layer.

FIGS. 5A–B show two stages of a particular semiconductor process with which the forgoing monitoring technique is quite useful in a modified form. FIG. 5A shows a cross section of a beginning structure where a semiconductor substrate 91 carries a first dielectric layer 93 with a protective dielectric layer 95 therebetween. Another dielectric layer 97 overlays the layer 93 and extends through it and into the substrate 91 in a groove 99. This is a shallow trench isolation ("ASTI") structure where the layer 93 is silicon nitride, with a refractive index n=2.0, and the layer 97 and material extending into the groove 99 is silicon dioxide, with a refractive index n=1.46. The process goal is to remove the layer 97 entirely, except for the portion extending into the groove 99, to result in the structure shown in FIG. 5B.

The curve of FIG. 6 illustrates use of the techniques of the present invention to monitor the material removal, generally by CMP, that converts the structure of FIG. 5A to that of FIG. 5B. In a first period of time 101, removal of the layer 97 is monitored as described above with respect to the example of FIGS. 3A–D and 4. But it is now important to determine when the layer 97 has been completely removed; that is, when a breakthrough occurs. This is determined by monitoring the d.c. offset of the signal. Because the indices of refraction of the two layers 93 and 97 are unequal, there will be a shift in the d.c. offset once the layer 97 is removed and the layer 93 is then being monitored in a time period 103. Therefore, a d.c. offset trigger point 105 is established to be some amount above or below the d.c. offset that is measured during the period 101. In this case, because of the relative indices of refraction of the layer materials, the trigger point is above the d.c. offset of the signal during the period 101. When that trigger is reached, the processing is usually terminated but, if desired, it can be continued during a period 103 to reduce the thickness of the layer 93 by some amount.

Although the various aspects of the present invention have been described with respect to their preferred embodiments, it will be understood that the invention is entitled to protection within the full scope of the appended claims.

It is claimed:

1. A method of in situ monitoring of a process of modifying a thickness of an optically transparent layer, comprising:

directing optical radiation against said layer in a manner that a first portion of said radiation is reflected from a surface of said transparent layer that is affected by the thickness modification and a second portion of said radiation is reflected from another surface that is not affected by the thickness modification, detecting a signal resulting from an interference between said first and second reflected portions of said optical radiation, said signal having a magnitude that varies over time according to an approximation of a sinusoidal function as the thickness of the layer is modified, forming from said signal an auxiliary function that is shifted in phase with respect to the signal by one-quarter of a period of said signal, determining values of time and magnitude of the signal at occurrences of peaks and valleys of said signal and said auxiliary function, ascertaining, from the determined values of the signal at the occurrence of at least one peak or valley of each of the signal and auxiliary function, quantities related to a period of magnitude variation of the signal, a d.c. offset of the signal and amplitude of the varying signal, and calculating, from said quantities and an index of refraction of the material of said layer, at least one number related to the transparent layer thickness.

2. The method of claim 1, additionally comprising comparing said at least one number related to the transparent layer thickness to a user specified layer thickness number, and providing an indication when the calculated at least one number reaches the user specified number.

3. The method of claim 1, additionally comprising calculating a statistical indication of a range of magnitudes of successive periods of magnitude variation of the signal, comparing the statistical indication with a user specified variation, and providing an indication when the calculated statistical indication exceeds the user specified amount.

4. The method of claim 1, wherein calculating at least one number related to the transparent layer thickness includes calculating a rate of change of the layer thickness.

5. The method of claim 4, additionally comprising comparing the calculated rate of change of the layer thickness with a user specified rate, and providing an indication of a relationship between the calculated rate of change and the user specified rate.

6. The method of claim 1, additionally comprising calculating averages of the calculated period, d.c. offset and amplitude of the signal, generating a reference signal from said averages., and comparing the reference signal with the detected signal, and providing an indication of a degree of closeness of fit of the reference and detected signals.

7. The method of claim 1, additionally comprising monitoring the d.c. offset of the signal, detecting when the d.c. offset changes by a specified amount, and providing an indication thereof.

8. The method of any one of claims 1–7, wherein the thickness modifying process being monitored includes removing material from said transparent layer surface.

9. The method of claim 8, wherein the material removing process includes a process of chemical-mechanical-polishing.

10. The method of any one of claims 1–7, wherein the thickness modifying process being monitored includes increasing the thickness of the transparent layer.

11. The method of claim 10, wherein the thickness of the transparent layer is being increased by depositing material on said transparent layer surface by a process of chemical vapor deposition.

12. A method of monitoring a process of removing material from one side of an optically transparent layer, comprising:

directing optical radiation against and said layer in a manner that a first portion of said radiation is reflected from said one transparent layer side and a second portion of said radiation is reflected from another surface that is not affected by the material removal process, detecting a signal resulting from an interference between said first and second reflected portions of said optical radiation, said signal having a magnitude that varies over time according to an approximation of a sinusoidal function as material is removed from said one transparent layer side, forming from said signal an auxiliary function that is shifted in phase with respect to the signal by one-quarter of a period of said signal, determining values of time and magnitude of the signal at occurrences of peaks and valleys of said signal, determining values of time and magnitude of the signal at occurrences of peaks and valleys of the auxiliary function, ascertaining, from the determined values of the signal at the occurrences of at least one peak or valley of each of the signal and auxiliary function, quantities related to a period of magnitude variation of the signal, a d.c. offset of the signal and amplitude of the varying signal, and calculating, from said quantities and an index of refraction of the material of said layer, at least one number related to an amount of material being removed from the layer.

13. The method of claim 12, additionally comprising comparing the calculated at least one number to a user specified number, and providing an indication when the calculated number reaches the user specified number.

14. The method of claim 12, additionally comprising calculating a statistical indication of a range of magnitudes of successive periods of magnitude variation of the signal, comparing the statistical indication with a user specified variation, and providing an indication when the calculated statistical indication exceeds the user specified amount.

15. The method of claim 12, wherein calculating at least one number related to an amount of material being removed from the layer includes calculating a rate of material removal, and additionally comprising comparing the calculated rate of removal of material with a user specified rate, and providing an indication of a relationship between the calculated amount and the user specified amount.

16. The method of claim 12, additionally comprising calculating averages of the calculated period, d.c. offset and amplitude of the signal, generating a reference signal from said averages, and comparing the reference signal with the detected signal, and providing an indication of a degree of closeness of fit of the reference and detected signals.

17. The method of claim 12, additionally comprising monitoring the d.c. offset of the signal, detecting when the d.c. offset changes by a specified amount, and providing an indication of a breakthrough of said layer to an underlying material.

18. The method of any one of claims 12–17, wherein the material removal process being monitored is a chemical-mechanical-polishing process.

19. In a process of monitoring the removal of material from one surface of an optically transparent layer, wherein a beam of substantially coherent optical radiation is directed against said layer in a manner that a first portion of said radiation is reflected from said one transparent layer surface and a second portion of said radiation is reflected from another surface that is not affected by the material removal process, and a signal resulting from an interference between said first and second reflected portions of said optical radiation is detected, wherein said signal has a magnitude that varies over time according to an approximation of a sinusoidal function as material is removed from said one transparent layer surface, a method of processing said signal:

forming from said signal an auxiliary function that is shifted in phase with respect to the signal by one-quarter of a period of said signal, initially determining values of time and magnitude of the signal at a first occurrence of a peak or valley of said signal, initially determining values of time and magnitude of the signal at a first occurrence of a peak or valley of the auxiliary function, ascertaining, from said determined values of only said first occurrence of a peak or valley of the signal and only said first occurrence of a peak or valley of the auxiliary function, initial quantities related to a period of magnitude variation of the signal, a d.c. offset of the signal and amplitude of the varying signal, calculating, from said initial quantities and an index of refraction of the material of said layer, an amount of said layer material removed and a rate of such removal, subsequently determining values of the time and magnitude of the signal at additional occurrences of peaks and valleys of the signal and of the auxiliary function, repetitively ascertaining, from the initially and subsequently determined values of the occurrences of peaks and valleys of the signal and of the auxiliary function, the quantities related to the period of magnitude variation of the signal, the d.c. offset of the signal and amplitude of the varying signal, and repetitively calculating, from said repetitively ascertained quantities and an index of refraction of the material of said layer, the amount of said layer material removed and the rate of such removal.

20. The method of claim 19, additionally comprising comparing the calculated amount of said layer material removed to a user specified amount, and providing an indication when the calculated amount reaches the user specified amount.

21. The method of claim 19, additionally comprising calculating a statistical indication of a range of magnitudes of successive periods of magnitude variation of the signal, comparing the statistical indication with a user specified variation, and providing an indication when the calculated statistical indication exceeds the user specified amount.

22. The method of claim 19, additionally comprising comparing the calculated rate of such removal of material with a user specified rate, and providing an indication of a relationship between the calculated amount and the user specified amount.

23. The method of claim 19, additionally comprising calculating averages of the calculated period, d.c. offset and amplitude of the signal, generating a reference signal from said averages, and comparing the reference signal with the detected signal, and providing an indication of a degree of closeness of fit of the reference and detected signals.

24. The method of claim 19, additionally comprising monitoring the d.c. offset of the signal, detecting when the d.c. offset changes by a specified amount, and providing an indication thereof.

25. The method of any one of claims 19–24, wherein the material removal process being monitored is a chemical-mechanical-polishing process.

26. A method of in situ monitoring of a process of modifying a thickness of an optically transparent layer, comprising:

directing optical radiation against said layer in a manner that a first portion of said radiation is reflected from a surface of said transparent layer that is affected by the thickness modification and a second portion of said radiation is reflected from another surface that is not affected by the thickness modification, detecting a signal resulting from an interference between said first and second reflected portions of said optical radiation, said signal having a magnitude that varies over time according to an approximation of a sinusoidal function as the thickness of the layer is modified, forming from said signal an auxiliary function that is shifted in phase with respect to the signal by one-quarter of a period of said signal, determining values related to characteristics of wavelengths of the signal and the auxiliary function, and ascertaining a quantity related to a d.c. offset of the signal from the determined values.

27. The method of claim 26, additionally comprising monitoring the d.c. offset of the signal, detecting when the d.c. offset changes by a specified amount, and providing an indication thereof.

28. The method of claim 26, additionally comprising ascertaining quantities related to a period of magnitude variation of the signal and an amplitude of the signal.

29. The method of claim 28, additionally comprising calculating averages of the calculated period, d.c. offset and amplitude of the signal, generating a reference signal from said averages, and comparing the reference signal with the detected signal, and providing an indication of a degree of closeness of fit of the reference and detected signals.

30. A method of in situ monitoring of a process of modifying a thickness of an optically transparent layer, comprising:

directing optical radiation against said layer in a manner that a first portion of said radiation is reflected from a surface of said transparent layer that is affected by the thickness modification and a second portion of said radiation is reflected from another surface that is not affected by the thickness modification, detecting a signal resulting from an interference between said first and second reflected portions of said optical radiation, said signal having a magnitude that varies over time according to an approximation of a sinusoidal function as the thickness of the layer is modified, forming from said signal an auxiliary function that is shifted in phase with respect to the signal by one-quarter of a period of said signal, determining values of time at a first occurrence of a peak or valley of the signal and the auxiliary function, ascertaining, from said determined values of time at only said first occurrence of the peak or valley of the signal and the auxiliary function, a quantity related to a period of magnitude variation of the signal, and calculating at least one number related to the transparent layer thickness from said quantity.

31. The method of claim 30, wherein said at least one number related to the transparent layer thickness is also calculated from an index of refraction of the material of said layer.

32. The method of claim 30, additionally comprising comparing said at least one number related to the transparent layer thickness to a user specified layer thickness number, and providing an indication when the calculated at least one number reaches the user specified number.

33. The method of claim 30, additionally comprising calculating a statistical indication of a range of magnitudes of successive periods of magnitude variation of the signal, comparing the statistical indication with a user specified variation, and providing an indication when the calculated statistical indication exceeds the user specified amount.

34. The method of claim 30, additionally comprising measuring a magnitude of the signal at the determined times of the peaks and valleys of said signal and auxiliary function, and further ascertaining, from the measured times and magnitudes of said at least one peak or valley of each of the signal and auxiliary function, quantities related to a d.c. offset of the signal and an amplitude of the varying signal.

35. The method of claim 34, wherein said calculating at least one number related to the transparent layer thickness includes calculating a rate of change of the layer thickness.

36. The method of claim 35, additionally comprising comparing the calculated rate of change of the layer thickness with a user specified rate, and providing an indication of a relationship between the calculated rate of change and the user specified rate.

37. The method of claim 34, additionally comprising calculating averages of the calculated period, d.c. offset and amplitude of the signal, generating a reference signal from said averages, and comparing the reference signal with the detected signal, and providing an indication of a degree of closeness of fit of the reference and detected signals.

38. The method of claim 34, additionally comprising monitoring the d.c. offset of the signal, detecting when the d.c. offset changes by a specified amount, and providing an indication thereof.

39. The method of any one of claims 30–38, wherein the thickness modifying process being monitored includes removing material from said transparent layer surface.

40. The method of claim 39, wherein the material removing process includes a process of chemical-mechanical-polishing.

41. The method of any one of claims 30–38, wherein the thickness modifying process being monitored includes increasing the thickness of the transparent layer.

42. The method of claim 41, wherein the thickness of the transparent layer is being increased by depositing material on said transparent layer surface by a process of chemical vapor deposition.

* * * * *